US011686147B2

(12) United States Patent
Ramage et al.

(10) Patent No.: US 11,686,147 B2
(45) Date of Patent: Jun. 27, 2023

(54) AUTOMATED CARGO DOOR OPENER

(71) Applicant: Mitsos Restaurants LLC, New Castle, PA (US)

(72) Inventors: Kenneth A. Ramage, Olean, NY (US); Scott A. Ramage, Randolph, NY (US); Dusty R. Ramsey, Franklinville, NY (US)

(73) Assignee: Mitsos Restaurants LLC, New Castle, PA (US)

( * ) Notice: Subject to any disclaimer, the term of this patent is extended or adjusted under 35 U.S.C. 154(b) by 240 days.

(21) Appl. No.: 17/050,564

(22) PCT Filed: Apr. 23, 2019

(86) PCT No.: PCT/US2019/028627
§ 371 (c)(1),
(2) Date: Oct. 26, 2020

(87) PCT Pub. No.: WO2019/209773
PCT Pub. Date: Oct. 31, 2019

(65) Prior Publication Data
US 2021/0238908 A1 Aug. 5, 2021

Related U.S. Application Data

(60) Provisional application No. 62/663,396, filed on Apr. 27, 2018.

(51) Int. Cl.
*E05F 15/686* (2015.01)
*B60J 5/10* (2006.01)

(52) U.S. Cl.
CPC ............ *E05F 15/686* (2015.01); *B60J 5/108* (2013.01); *E05Y 2201/434* (2013.01); *E05Y 2201/654* (2013.01); *E05Y 2201/684* (2013.01); *E05Y 2400/32* (2013.01); *E05Y 2900/516* (2013.01)

(58) Field of Classification Search
CPC ....... E05F 15/686; E05F 15/681; B60J 5/108; B60J 5/12
See application file for complete search history.

(56) References Cited

U.S. PATENT DOCUMENTS

| 2,755,081 | A | | 7/1956 | Johnson et al. |
| 3,104,910 | A | | 9/1963 | Kappen |
| 4,860,813 | A | | 8/1989 | Ballyns et al. |
| 5,056,847 | A | | 10/1991 | Stillwell et al. |
| 5,243,784 | A | | 9/1993 | Whitaker et al. |
| 5,532,521 | A | | 7/1996 | Leininger |
| 5,698,073 | A | * | 12/1997 | Vincenzi ............ E05B 65/0021 292/DIG. 36 |
| 5,738,161 | A | | 4/1998 | Martin |

(Continued)

*Primary Examiner* — Gregory J Strimbu
(74) *Attorney, Agent, or Firm* — The Webb Law Firm

(57) ABSTRACT

A door operator assembly is configured to raise and lower a cargo door of a cargo enclosure. The assembly includes a power and control unit mounted on an exterior of the cargo enclosure. The power and control unit includes a motor, a coupler operatively connecting the motor to a torsion assembly of the cargo door, a manual release mechanism for actuating the coupler to connect and disconnect the motor and the torsion assembly of the cargo door, and a control circuit for the motor. The assembly may also include an operating switch disposed on the exterior of the cargo enclosure.

10 Claims, 4 Drawing Sheets

(56) References Cited

U.S. PATENT DOCUMENTS

| | | | |
|---|---|---|---|
| 5,864,134 | A | 1/1999 | Burgess |
| 6,276,744 | B1 | 8/2001 | Huber et al. |
| 6,719,032 | B1 | 4/2004 | Miers |
| 7,111,895 | B2 | 9/2006 | Rivers et al. |
| 8,438,784 | B1 | 5/2013 | Marinelli |
| 8,959,838 | B1 | 2/2015 | Marinelli |
| 9,080,367 | B2 | 7/2015 | Orton et al. |
| 2001/0032486 | A1 | 10/2001 | Doucette |
| 2001/0035667 | A1 | 11/2001 | Gaeta |
| 2005/0073173 | A1 | 4/2005 | Belanger et al. |
| 2006/0119132 | A1 | 6/2006 | Rivers et al. |
| 2007/0256797 | A1 | 11/2007 | Orton et al. |
| 2011/0032073 | A1* | 2/2011 | Mullet ............... G07C 9/00182 340/5.7 |

\* cited by examiner

AUTOMATED CARGO DOOR OPENER

CROSS REFERENCE TO RELATED APPLICATIONS

This application is the United States national phase of International Application No. PCT/US2019/028627 filed Apr. 23, 2019, and claims priority to U.S. Provisional Patent Application No. 62/663,396, filed on Apr. 27, 2018, the disclosures of which are hereby incorporated by reference in their entirety.

BACKGROUND OF THE INVENTION

Field of the Invention

The present invention relates to an automated operator assembly for a door for a cargo enclosure, such as a vehicle cargo enclosure. More specifically, the present invention relates to an automated door operator assembly that can be actuated from the exterior of the cargo enclosure with minimal physical strain by the operator and which has components mounted on an exterior of the cargo enclosure with minimal intrusion on the cargo space.

Description of Related Art

Vehicle cargo enclosures, such as enclosed trailers and "box truck" cargo holds, typically include an overhead vertically opening and closing door disposed at the rear of the cargo enclosure for accessing the interior cargo space of the enclosure. Such doors are usually opened manually by an operator, such as the driver. Manual operation of overhead doors imposes extra wear to the door components. These doors are heavy and it takes a large amount of force to start them moving, but most operators exert too much force on the doors. This rapid movement wears the components quickly. Rapid movement of a heavy object requires a larger amount of force to stop the movement, so most operators just allow the door to slam against the stop mechanisms, which increases the likelihood of damage. This type of operation requires more maintenance to the door and shortens its operating life, raises cost, and reduces profitability.

Also, continuously opening and closing heavy overhead doors poses health risks to the operators using these doors. Repetitive injuries, strains, and sprains can occur even in ideal conditions. Poor weather conditions add the possibility of slips and falls. Injuries raise costs, reduce profitability, and can have legal consequences.

Automated door actuator assemblies have been provided for opening and closing overhead doors of a vehicle cargo enclosure. Typically, such assemblies are analogous to and operate similarly to garage door openers for opening and closing garage doors provided on stationary structures. That is, the assemblies include a motor mechanism disposed or supported centrally on the ceiling of the cargo enclosure and include a chain or pulley mechanism for raising and lowering the cargo door on its tracks. Such assemblies take up space within the cargo enclosure. In the commercial trucking industry, cargo space is limited. Any space not used for cargo reduces efficiency, raises costs, and reduces profitability.

Additionally, weight restrictions placed on the roads and the vehicles themselves forces the trucks to be built as light as is reliably possible, since the weight of the vehicle is subtracted from the allowable limits. Further, the cargo enclosure's primary function is simply a weather shield, and most enclosures are constructed to be just rigid enough to hold together against wind load at highway speeds. The only part of the enclosure that is designed to support any load is the rear door frame and it is just strong enough to hold the door. Typical prior art automated door operators place a physical load on the structure of the cargo enclosure, both in terms of the weight of the assembly and in terms of torque and linear loads generated during operation of the assembly. The imposition of these loads on the cargo enclosure requires that the enclosure be reinforced or provided with a load bearing frame in the region of the door operator assembly, which increases the weight of the cargo enclosure and further intrudes upon the available cargo space.

SUMMARY OF THE INVENTION

According to an example of the present disclosure, an automated door operator assembly is provided that includes an electromechanical device for opening and closing vertically retracting doors (overhead door) where space is limited or at a premium for storage, such as commercial trucking. Placement of a relatively small power and control unit on the outside of the cargo box walls means there is minimal or no reduction of interior space. This unit may be sized so as to extend to less than the width of the truck's rearview mirrors and to not interfere with visibility or normal operation of the vehicle. The power unit's output shaft passes through the wall of the cargo box and connects to the end of the existing torque shaft of the door. A pusher assembly may be provided to prevent unspooling of the door cables but does not reduce load capacity and impede material handling.

The assembly may be powered by the vehicle's existing electric system. Operation of the assembly may be carried out by a switch and require no manual force. The assembly may automatically stop the door at the proper locations to prevent damage. The assembly may apply a constant force to the overhead door and maintain a constant speed throughout the door's movement and does not slam the overhead door at the end of its travel. The assembly may also reduce the chances of injuries. The switch may be placed on the exterior of the cargo enclosure such that the operator is not required to climb up onto the rear of the truck. The assembly may be externally mounted and may only minimally reduce cargo space or may not reduce cargo space at all, and may not or only minimally obstruct material handling of the cargo.

The assembly may be considerably lighter than the typical designs, which reduces its effect on payload restrictions. This feature allows for the assembly to be mounted to the cargo enclosure without stressing the structure or requiring additional bracing. The positioning of the drive system of the assembly may be partially supported by the existing rear door frame and directly connect to the existing torque shaft of the door so that torsional or linear loads (depending on the design of the enclosure and the door) applied to the enclosure during opening and closing of the access door are minimized or eliminated.

According to another example of the present disclosure, a door operator assembly configured to raise and lower a cargo door of a vehicle cargo enclosure is provided. The door operator assembly comprises a power and control unit configured to be mounted on an exterior of the vehicle cargo enclosure. The power and control unit comprises a motor in communication with a power source of the vehicle, the motor comprising an output configured to be operatively connected to a torsion assembly of the cargo door; a coupler configured to operatively connect the output of the motor to the torsion assembly of the cargo door; a manual release mechanism configured to actuate the coupler to operatively connect and disconnect the output of the motor and the torsion assembly of the cargo door; a control circuit configured to relay electrical power from the power source of the vehicle to the motor; and an enclosure configured to house the motor and the manual release mechanism on the exterior of the vehicle cargo enclosure. The assembly further comprises an operating switch disposed on the exterior of the vehicle cargo enclosure, the operating switch being in communication between the vehicle power source and the control circuit and configured to be actuated to activate the motor to raise or lower the cargo door.

According to a particular example of the present disclosure, a door operator assembly configured to raise and lower a cargo door of a cargo enclosure is provided. The assembly comprises a power and control unit configured to be mounted on an exterior of the cargo enclosure. The power and control unit comprises a motor in communication with a power source, the motor comprising an output configured to operatively connect to a torsion assembly of the cargo door; a coupler configured to operatively connect the output of the motor to the torsion assembly of the cargo door; a control circuit configured to relay electrical power from the power source to the motor; and a unit enclosure configured to house the motor on the exterior of the cargo enclosure.

According to another example of the present disclosure, a cargo enclosure is provided. The cargo enclosure comprises a plurality of walls defining an interior and an exterior of the cargo enclosure; a cargo door movable between a fully open position and a fully closed position; a set of tracks supporting the cargo door on the cargo enclosure for movement between the fully open position and the fully closed position; a door torsion assembly disposed on the cargo enclosure and configured to apply torque to the cargo door to facilitate movement of the cargo door from the fully closed position to the fully open position; and a door operator assembly configured to raise and lower the cargo door. The door operator assembly comprises a power and control unit mounted on an exterior of the cargo enclosure. The power and control unit comprises a motor in communication with a power source, the motor comprising an output configured to be operatively connected to the door torsion assembly; a coupler configured to operatively connect the output of the motor to the door torsion assembly, the coupler extending through one of the plurality of walls of the cargo enclosure to engage the door torsion assembly; a control circuit configured to relay electrical power from the power source to the motor; and a unit enclosure configured to house the motor on the exterior of the cargo enclosure.

These and other features and characteristics of the present invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
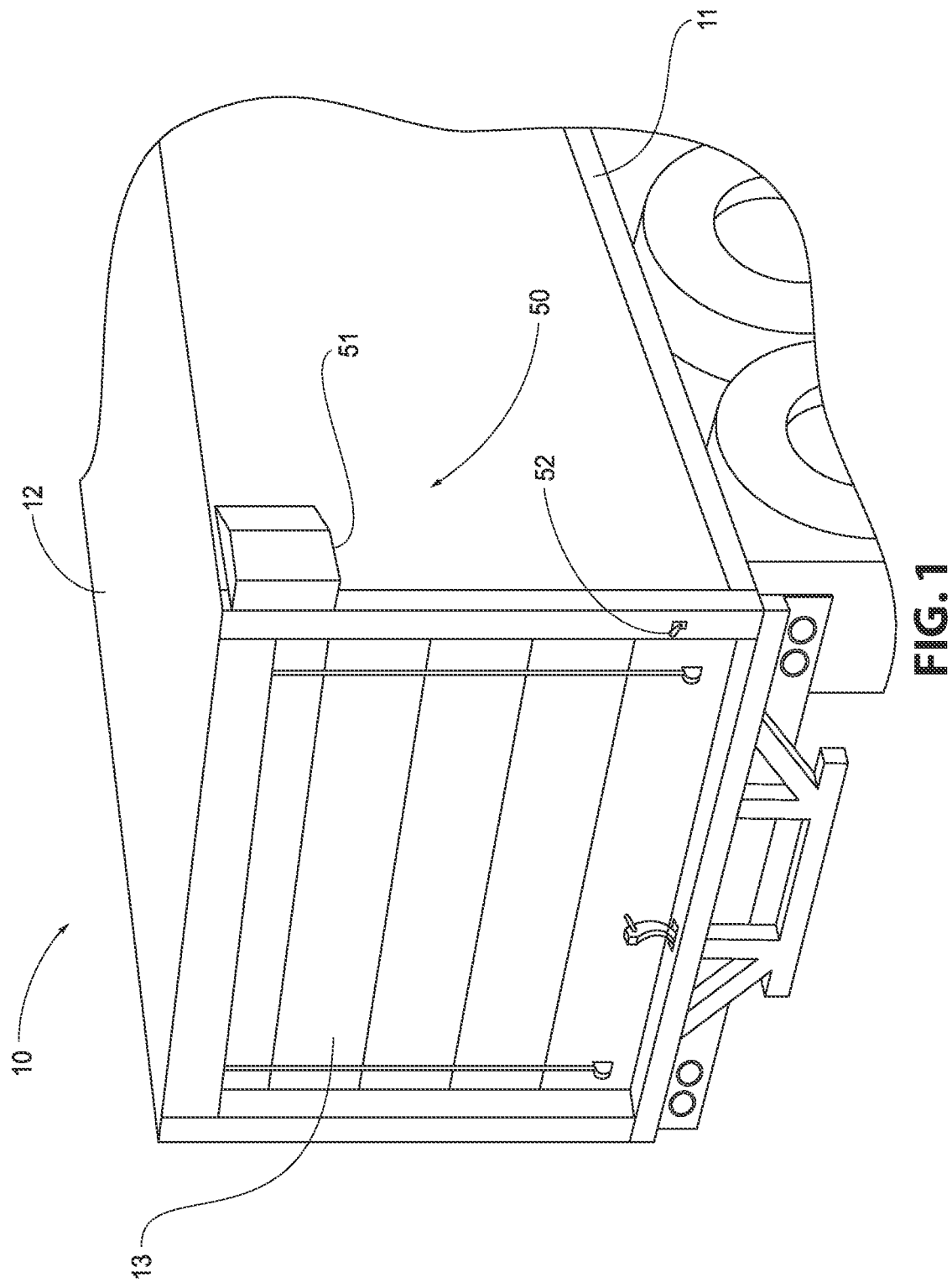
FIG. 1 is a perspective view of a vehicle cargo enclosure including a door operator assembly according to an example of the present disclosure.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings and described in the following specification are simply exemplary embodiments or aspects of the invention. Hence, specific dimensions and other physical characteristics related to the embodiments or aspects disclosed herein are not to be considered as limiting.

Figure 2:
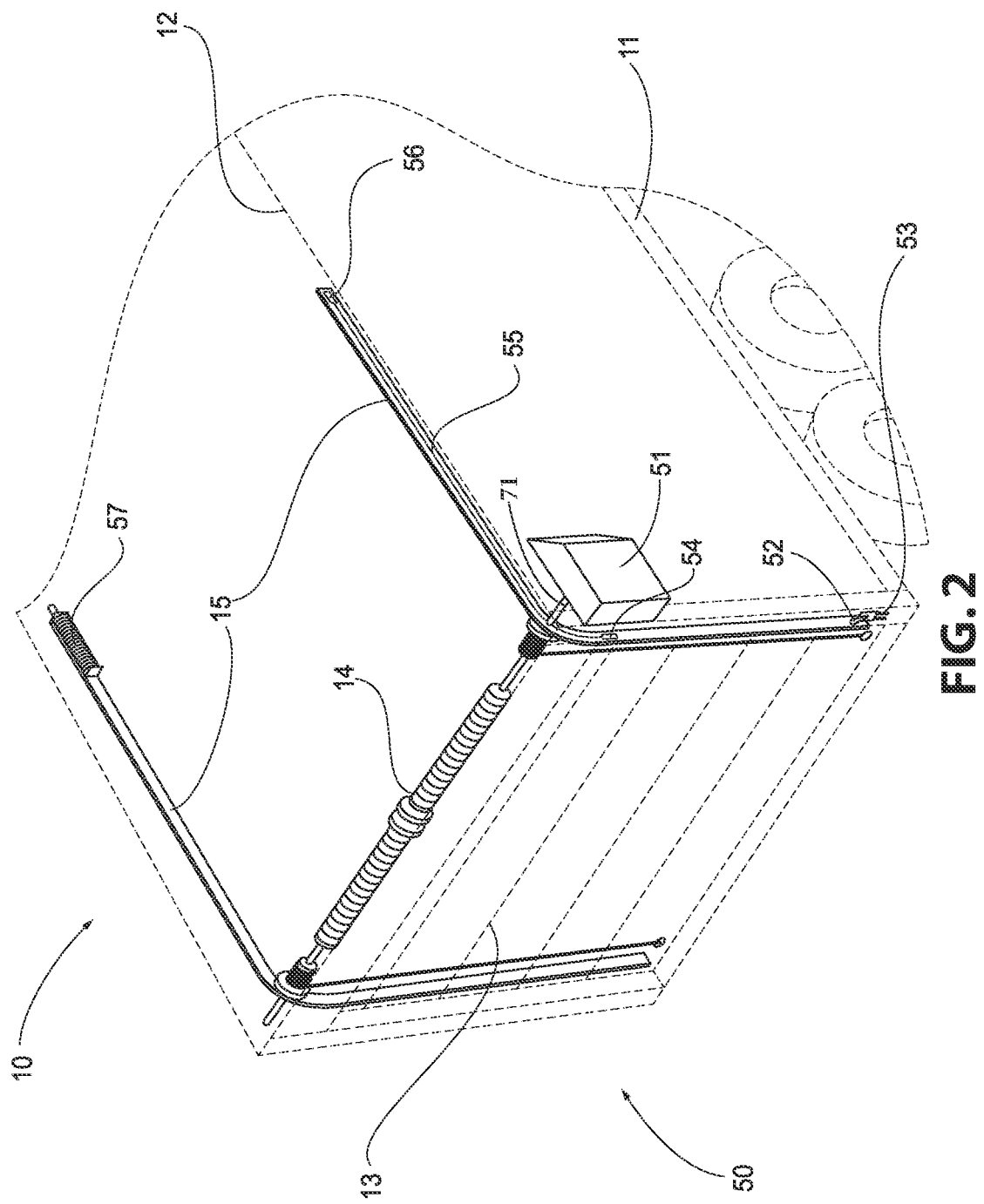
FIG. 2 is another perspective view of the vehicle cargo enclosure with certain portions rendered transparent to view certain components of the door operator assembly of FIG. 1.

With reference to FIGS. 1-4, an automated door operator assembly 50 for raising and lowering a rear overhead cargo door 13 of a vehicle cargo enclosure 12 is shown in accordance with an example of the present disclosure. As shown in FIGS. 1 and 2, according to the illustrated example, the door operator assembly 50 is provided on a cargo trailer 10 of a semi-trailer truck having a cargo enclosure 12 assembled on a chassis 11 of the trailer 10. It is to be appreciated that the door operator assembly 50 may be provided in association with a cargo hold of a box truck or any other cargo hold or enclosure associated with a vehicle or in association with a shipping container not specifically configured to be mounted on a road vehicle chassis.

The cargo enclosure 12 includes a plurality of walls defining an interior and an exterior of the cargo enclosure and incorporates a cargo door 13 familiar to those having ordinary skill in the art. The cargo door 13 is movable between a fully open position in which the cargo door 13 is disposed overhead within the interior of the cargo enclosure 12 and a fully closed position in which the cargo door 13 completely shuts a door opening in the cargo enclosure 12. The door 13 is supported on a set of door tracks 15 extending vertically and into the cargo enclosure 12 with respect to the rear of the cargo enclosure 12 so that the door may be raised and lowered vertically with respect to the door opening and be disposed overhead within the cargo enclosure 12 when fully opened. A door torsion assembly 14, such as a torsion shaft and associated springs and mounting hardware which is familiar to those having ordinary skill in the art, is provided above the door opening and engages the cargo door 13 in order to assist an operator to raise the cargo door 13 by applying a torque to the cargo door 13 as the door is opened. It is to be appreciated that the door operator assembly 50 may be utilized in association with access doors that are not disposed at the rear of a cargo trailer 10 or box truck. It is also to be appreciated that the door operator assembly 50 may be utilized in connection with cargo access doors having different configurations and associated components, such as doors not specifically provided with a torsion assembly.

Figure 3:
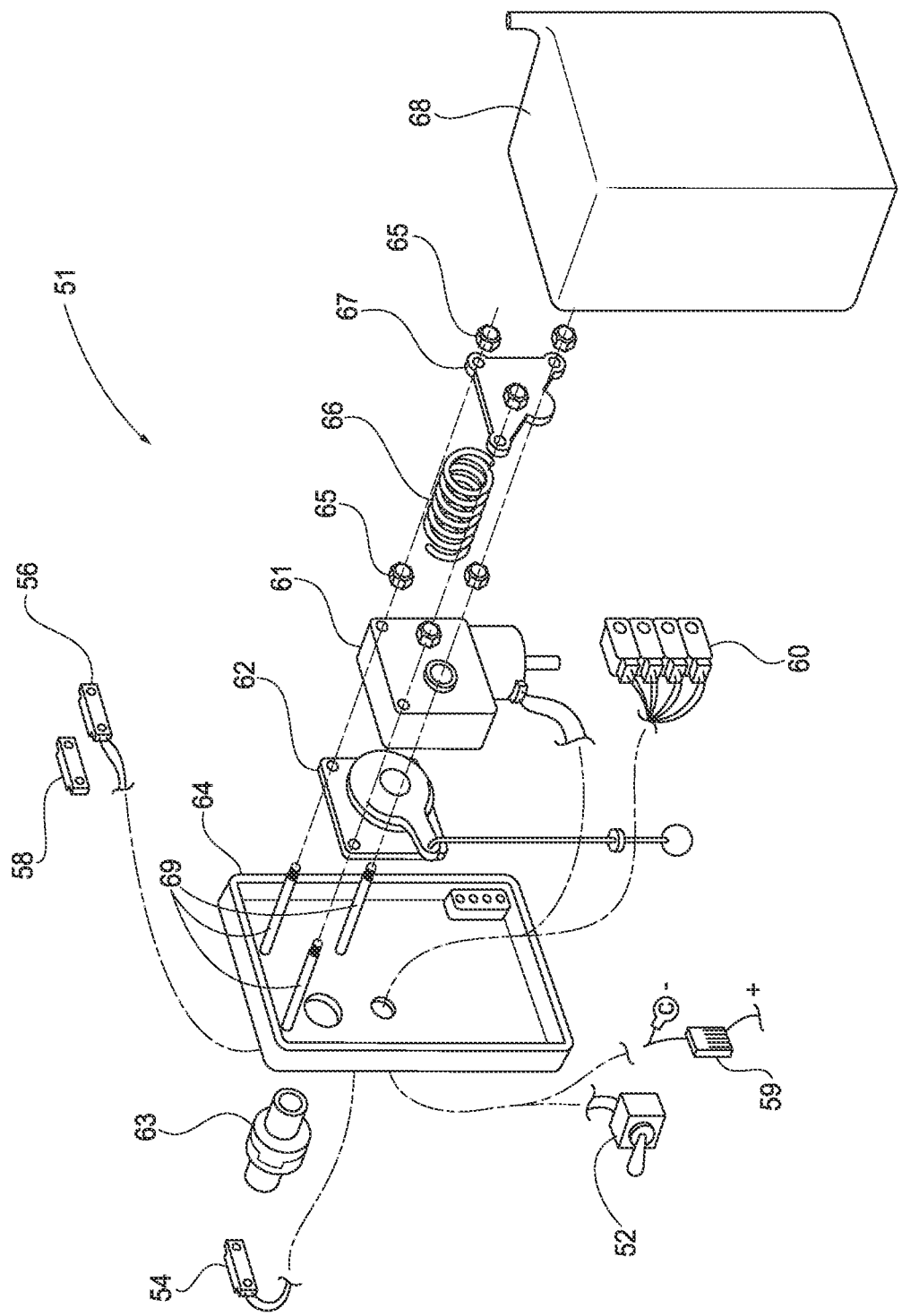
FIG. 3 is an exploded view of a power and control unit and related components of the door operator assembly of FIG. 1.

As shown in FIGS. 1-3, the door operator assembly 50 includes a power and control unit 51 mounted on the exterior of the cargo enclosure 12 at a location aligned with or substantially aligned with or adjacent to the door torsion assembly 14.

The door operator assembly 50 also includes an operating switch 52 disposed on the exterior of the cargo enclosure 12. The operating switch 52 is positioned on the cargo enclosure 12 so as to be actuated by an operator, such as the vehicle driver, from the exterior of the vehicle to activate the power and control unit 51 to raise or lower the cargo door 13. According to one example, the operating switch 52 is positioned at a level such that the operator can reach and actuate the switch by hand without the necessity of stepping or climbing up onto the chassis 11 of the trailer 10. According to the example, the operating switch 52 is manually operated and must be held in the actuated state by the operator for the entire duration of an operation to open or close the cargo door 13. This requirement is to ensure that the operator is present throughout the opening or closing operation to prevent damage to the door 13, loading equipment, cargo containers, and other workers in the area. According to another example of the disclosure, the power and control unit 51 is connected to a microcontroller that controls operation of the power and control unit 51 based on commands issued by the driver from the vehicle cab or from an automated control system of the vehicle.

Figure 4:
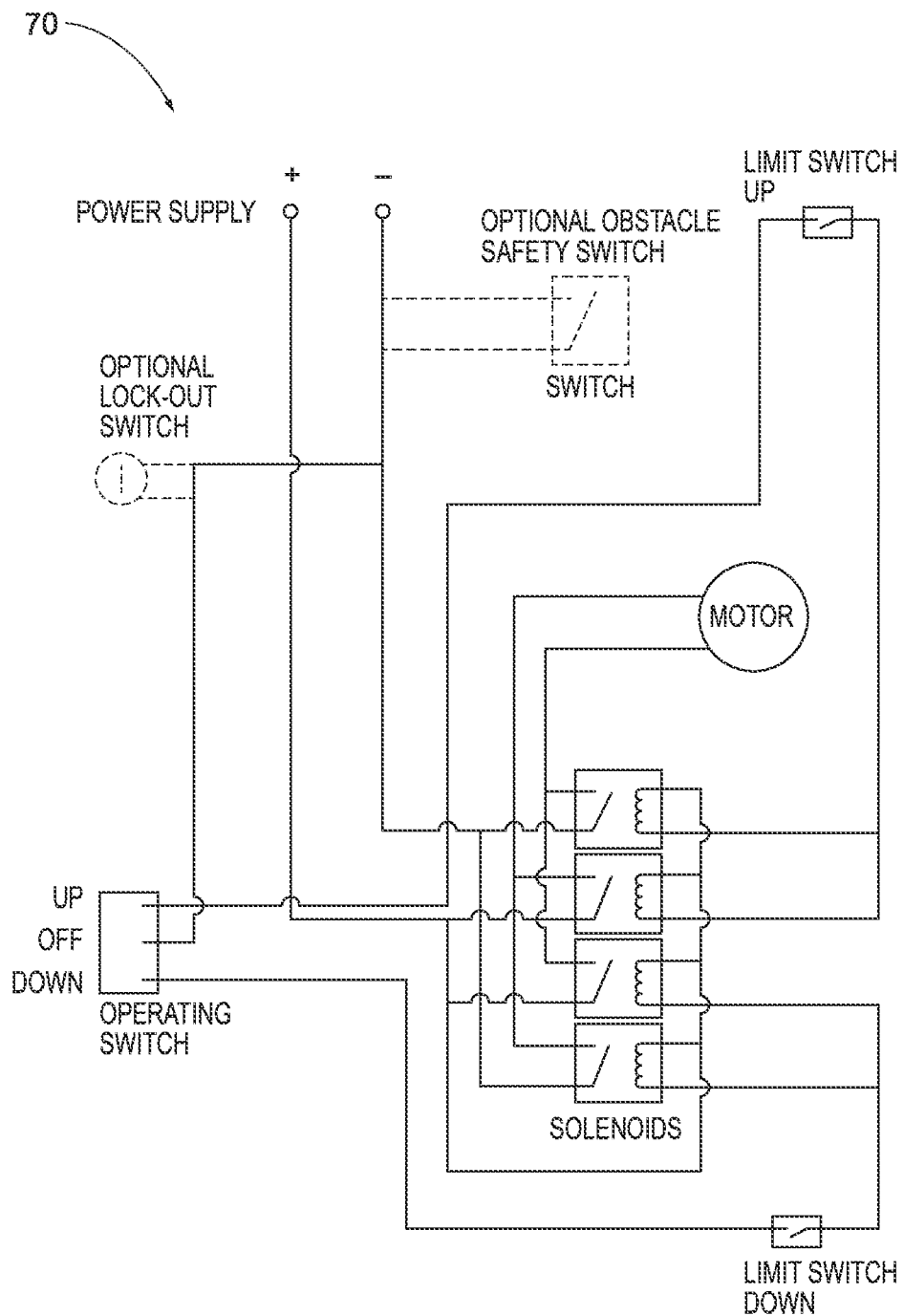
FIG. 4 is a schematic diagram of a control circuit of the power and control unit of FIG. 3.

As shown in FIGS. 1-3, the power and control unit 51 includes a motor 61, such as an electrically operated gear motor, which is in communication with a power source of the vehicle or another external electric power source. A power relay 60 is provided in the power and control unit 51 to connect the motor 61 to the operating switch 52. A control circuit 70, an example of which is illustrated schematically in FIG. 4, is provided to relay electrical power from the external power source to the motor 61 and to control operation of the motor 61 and, therefore, opening and closing of the door 13. As shown in FIGS. 1-3, the operating switch 52 is placed in communication between the external power source and the control circuit 70, shown in FIG. 4. The operating switch 52 is connected to the external power source by power leads 53 and a fuse 59.

The motor 61 includes an output 71 that is operatively connected to the door torsion assembly 14 of the cargo door 13. In particular, the output 71 of the motor 61 is connected to the door torsion assembly 14 by a coupler 63. The power and control unit 51 also includes a manual release mechanism 62 that is manually operable to actuate the coupler 63 to engage and disengage the output 71 of the motor 61 and the door torsion assembly 14.

The output 71 of the motor 61 is connected to the door torsion assembly 14 to provide torque to the door torsion assembly 14 to raise and lower the door 13 between the fully open and fully closed positions. Thus, according to the example, the power and control unit 51 of the door operator assembly 50 replaces the torque or force normally provided by the operator to manually lift and lower the door 13 with the assistance of the door torsion assembly 14. The power and control unit 51 is further provided with the coupler 63 and the manual release mechanism 62 so that the output 71 of the motor 61 may be manually engaged and disengaged from the door torsion assembly 14 to allow for door 13 to be opened and closed manually in the event of a malfunction or failure in the mechanism of the power and control unit 51 or in the event of a power failure. The manual release mechanism 62 includes a lever and a spring 66 held in place against the motor 61 and the lever by a spring plate 67 that biases the output 71 of the motor 61 and the coupler to engage the door torsion assembly 14.

The power and control unit 51 also includes a unit enclosure that houses the motor 61, the manual release mechanism 62, the power relay 60, and additional components of the power and control unit 51 on the exterior of the cargo enclosure 12. The unit enclosure includes a mounting plate 64 and a cover 68. The mounting plate 64, the manual release mechanism 62, the motor 61, and the spring plate 62 may be directly fastened to the exterior of the cargo enclosure 12 by mounting bolts 69 and secured by a plurality of nuts 65. The cover 68 may, in turn, be fastened directly to the mounting plate 64 in any manner found to be suitable to one having ordinary skill in the art. The cover 68 may be releasably fastened to the mounting plate 64 to allow for convenient removal of the cover 68 to access the components of the power and control unit 51, in particular, the manual release mechanism 62. As shown in FIGS. 1 and 2, the unit enclosure of the power and control unit 51 is mounted on the exterior of the cargo enclosure 12 so as to not reduce or only minimally reduce the interior cargo space of the enclosure 12. According to an example, the overall size of the power and control unit 51 is configured to be small enough to not impede a rearward view of the driver via the side mirrors of the vehicle or interfere with normal operations of the vehicle, such as backing into cargo docks.

Also, according to the example, the coupler 63 extends from the interior of the unit enclosure of the power and control unit 51 and through one of the walls of the cargo enclosure 12 to engage an end of the door torsion assembly 14. The coupler 63 occupies unused space within the cargo enclosure in the upper rear corner of the cargo enclosure 12, resulting from the design of the cargo door 13, the door torsion assembly 14, and the door tracks 15. The coupler 63 does not reduce or only minimally reduces the available interior cargo space and does not interfere or only minimally interferes with cargo loading and unloading.

As shown in FIGS. 1-3, the door operator assembly 50 also includes a lower limit switch 54 and an upper limit switch 56 mounted on or near one of the door tracks 15 in positions so as to not reduce or only minimally reduce the available interior cargo space and not interfere or only minimally interfere with cargo loading and unloading. The lower and upper limit switches 54, 56 are connected to the power relay 60 and the motor 61 by a wiring harness 55 passed through the interior structure of the cargo enclosure 12 to reduce the possibility of damage. The wiring harness 55 is also arranged within the cargo enclosure 12 so as to not reduce or only minimally reduce the available interior cargo space and not interfere or only minimally interfere with cargo loading and unloading. A door indicator 58 or position sensor is attached to the top panel of the cargo door 13 and is positioned on the cargo door 13 such that it remains above the door tracks 15 so as to not reduce or only minimally reduce the available interior cargo space and not interfere or only minimally interfere with cargo loading and unloading.

According to an example, the lower and upper limit switches 54, 56 are magnetic limit switches that detect the proximity of the indicator 58, which may be a magnetic sensor or plate, to thereby detect the position of the cargo door 13 as the cargo door 13 approaches the fully open or closed positions. When the indicator 58 comes within the range of one of the limit switches 54, 56, the switch cuts off the transmission of power to the motor 61 to stop the transmission of torque from the output 71 of the motor 61 to the cargo door 13 via the door torsion assembly 14 and retain the door 13 in the respective fully open or fully closed position.

As shown in FIG. 2, the door operator assembly 50 may further include a pusher assembly 57 disposed at or near an end of one of the tracks 15. The pusher assembly 57 may be of a type familiar to those having ordinary skill in the art. According to the example, the pusher assembly 57 includes a spring-loaded plunger that engages an end of the cargo door 13 when the cargo door 13 is raised to prevent the cargo door 13 from becoming jammed or sticking in the open position. The pusher assembly 57 may also be actuated by the operator in a manner familiar to those having ordinary skill in the art to apply a pushing force to the end of the cargo door 13 to assist the operator and/or the door operator assembly 50 in returning the cargo door 13 to the fully closed position. According to the example, the pusher assembly 57 is positioned with respect to the end of the track 15 so as to not reduce or only minimally reduce the capacity of the cargo enclosure 12 and not interfere or only minimally interfere with cargo loading and unloading.

With reference to FIGS. 1-4, according to an example of the present disclosure, the automated door operator assembly 50 operates to open and close the cargo door 13 of the cargo enclosure 12, as follows. An operator actuates the door operator switch 52 disposed on the exterior of the cargo enclosure 12 to allow power from an external electrical power source, such as the electrical power system of the vehicle, to be transmitted to the motor 61 of the power and control unit 51 via the power relay 60 and the control circuit 70. The motor 61, when activated, outputs torque to the door torsion assembly 14, which engages the closed cargo door 13 to raise the door 13 along the tracks 15 to the fully open position, in a similar manner as when the door 13 is lifted manually by an operator. The operator must remain in place actuating the operator switch 52 throughout the operation to raise the door 13. As the cargo door 13 is raised along the tracks 15, the indicator 58 positioned on the cargo door 13 comes within the sensing range of the upper limit switch 56 to actuate the upper limit switch 56 to cut off the supply of power to the motor 61 and stop the cargo door 13 in the fully open position. The pusher assembly 57 may engage the cargo door 13 to prevent jamming or sticking of the cargo door 13 in the fully open position.

To subsequently close the cargo door 13, the pusher assembly 57 may be actuated to push the door 13 slightly away from the fully open position and prevent binding of the door 13 on the tracks 15. The door operator switch 15 is again actuated by the operator to supply power to the motor 61 to apply an opposing torque to the door torsion assembly 14, which engages the open door 13 to lower the door 13 along the tracks 15 to the fully closed position. As the door 13 is lowered to the closed position, the indicator 58 comes within the sensing range of the lower limit switch 54 to actuate the lower limit switch 54 to cut off the supply of power to the motor 61 and stop the door 13 in the fully closed position. In an event of a malfunction or power failure, the operator may access the manual release mechanism 62 of the power and control unit 51 to cause the coupler 63 to disengage the output 71 of the motor 61 from the door torsion assembly 14, thus allowing the door 13 to be opened and closed manually.

Further examples of the present disclosure will now be described in the following numbered clauses.

Clause 1: A door operator assembly (50) configured to raise and lower a cargo door (13) of a cargo enclosure (12), the assembly comprising: a power and control unit (51) configured to be mounted on an exterior of the cargo enclosure (12), the power and control unit (51) comprising: a motor (61) in communication with a power source, the motor (61) comprising an output 71 configured to operatively connect to a torsion assembly (14) of the cargo door (13); a coupler (63) configured to operatively connect the output 71 of the motor (61) to the torsion assembly (14) of the cargo door (13); a control circuit (70) configured to relay electrical power from the power source to the motor (61); and a unit enclosure configured to house the motor (61) on the exterior of the cargo enclosure (12).

Clause 2: The door operator assembly (50) according to clause 1, further comprising an operating switch (52) configured to be disposed on the exterior of the cargo enclosure (12), the operating switch (52) being in communication between the power source and the control circuit (70) and configured to be actuated to activate the motor (61) to raise or lower the cargo door (13).

Clause 3: The door operator assembly (50) according to clause 1 or clause 2, wherein the power and control unit (51) further comprises a manual release mechanism (62) configured to actuate the coupler (63) to operatively connect and disconnect the output 71 of the motor (61) and the torsion assembly (14) of the cargo door (13).

Clause 4: The door operator assembly (50) according to clause 3, wherein the manual release mechanism (62) is disposed in the unit enclosure between the output 71 of the motor (61) and the coupler (63).

Clause 5: The door operator assembly (50) according to clause 3 or clause 4, wherein the manual release mechanism (62) comprises a lever and a spring (66) retained by a spring plate (67), the spring (66) being configured to bias the output 71 of the motor (61) and the coupler (63) to engage the torsion assembly (14) of the cargo door (13).

Clause 6: The door operator assembly (50) according to any one of clauses 1-5, wherein the unit enclosure comprises a mounting plate (64) configured to be fastened to the exterior of the cargo enclosure (12) and a cover (68) removeably fastened to the mounting plate (64).

Clause 7: The door operator assembly (50) according to any one of clauses 1-6, further comprising lower and upper limit switches (54, 56) in communication with the power and control unit (51) and a door indicator (58) configured to be positioned on the cargo door (13), wherein the lower and upper limit switches (54, 56) are configured to detect the proximity of the door indicator (58) and thereby detect a position of the cargo door (13) and to deactivate the motor (61) as the door (13) approaches a fully open position or a fully closed position.

Clause 8: The door operator assembly (50) according to clause 7, wherein the lower and upper limit switches (54, 56) comprise magnetic limit switches, and the door indicator (58) comprises a magnetic sensor or plate.

Clause 9: The door operator assembly (50) according to any one of clauses 1-8, further comprising a pusher assembly (57) configured to be disposed in an interior of the cargo enclosure (12), the pusher assembly (57) comprising a spring-loaded plunger configured to engage an end of the cargo door (13) when the cargo door (13) is in the fully open position.

Clause 10: The door operator assembly (50) according to any one of clauses 1-9, wherein the cargo enclosure (12) is a vehicle cargo enclosure and the power source is a vehicle power source.

Clause 11: A cargo enclosure (12), comprising: a plurality of walls defining an interior and an exterior of the cargo enclosure (12); a cargo door (13) movable between a fully open position and a fully closed position; a set of tracks (15) supporting the cargo door (13) on the cargo enclosure (12) for movement between the fully open position and the fully closed position; a door torsion assembly (14) disposed on the cargo enclosure (12) and configured to apply torque to the cargo door (13) to facilitate movement of the cargo door (13) from the fully closed position to the fully open position; and a door operator assembly (50) configured to raise and lower the cargo door (13), the door operator assembly (50) comprising: a power and control unit (51) mounted on an exterior of the cargo enclosure (12), the power and control unit (51) comprising: a motor (61) in communication with a power source, the motor (61) comprising an output 71 configured to be operatively connected to the door torsion assembly (14); a coupler (63) configured to operatively connect the output 71 of the motor (61) to the door torsion assembly (14), the coupler (63) extending through one of the plurality of walls of the cargo enclosure (12) to engage the door torsion assembly (14); a control circuit (70) configured to relay electrical power from the power source to the motor (61); and a unit enclosure configured to house the motor (61) on the exterior of the cargo enclosure (12).

Clause 12: The cargo enclosure (12) according to clause 11, wherein the door operator assembly (50) further comprises an operating switch (52) disposed on the exterior of the cargo enclosure (12), the operating switch (52) being in communication between the power source and the control circuit (70) and configured to be actuated to activate the motor (61) to raise or lower the cargo door (13).

Clause 13: The cargo enclosure (12) according to clause 11 or clause 12, wherein the power and control unit (51) further comprises a manual release mechanism (62) configured to actuate the coupler (63) to operatively connect and disconnect the output 71 of the motor (61) and the door torsion assembly (14).

Clause 14: The cargo enclosure (12) according to clause 13, wherein the manual release mechanism (62) is disposed in the unit enclosure between the output 71 of the motor (61) and the coupler (63).

Clause 15: The cargo enclosure (12) according to clause 13 or clause 14, wherein the manual release mechanism (62) comprises a lever and a spring (66) retained by a spring plate (67), the spring (66) being configured to bias the output 71 of the motor (61) and the coupler (63) to engage the door torsion assembly (14).

Clause 16: The cargo enclosure (12) according to any one of clauses 11-15, wherein the unit enclosure comprises a mounting plate (64) fastened to the exterior of the cargo enclosure (12) and a cover (68) removeably fastened to the mounting plate (64).

Clause 17: The cargo enclosure (12) according to any one of clauses 11-16, wherein the door operator assembly (50) further comprises lower and upper limit switches (54, 56) in communication with the power and control unit (51) and a door indicator (58) positioned on the cargo door (13), wherein the lower and upper limit switches (54, 56) are configured to detect the proximity of the door indicator (58) and thereby detect a position of the cargo door (13) and to deactivate the motor (61) as the door (13) approaches the fully open position or the fully closed position.

Clause 18: The cargo enclosure (12) according to clause 17, wherein the lower and upper limit switches (54, 56) comprise magnetic limit switches, and the door indicator (58) comprises a magnetic sensor or plate.

Clause 19: The cargo enclosure (12) according to any one of clauses 11-18, wherein the door operator assembly (50) further comprises a pusher assembly (57) disposed in the interior of the cargo enclosure (12) adjacent to an upper end of at least one of the tracks (15), the pusher assembly (57) comprising a spring-loaded plunger configured to engage an end of the cargo door (13) when the cargo door (13) is in the fully open position.

Clause 20: The cargo enclosure (12) according to any one of clauses 11-19, wherein the cargo enclosure (12) is configured to be mounted on a vehicle chassis (11), and the power source is a vehicle power source.

Clause 21: A cargo enclosure (12) comprising a door operator assembly (50) according to any one of clauses 1-9.

Clause 22: A vehicle comprising a cargo enclosure (12) according to any one of clauses 11-19.

While specific embodiments of the invention have been described in detail, it will be appreciated by those having ordinary skill in the art that various modifications and alternatives to those details could be developed in light of the overall teachings of the disclosure. The presently preferred embodiments described herein are meant to be illustrative only and not limiting as to the scope of the invention, which is to be given the full breadth of the appended claims and any and all equivalents thereof.

The invention claimed is:

1. A cargo enclosure, comprising:
   a plurality of walls defining an interior and an exterior of the cargo enclosure;
   a cargo door movable between a fully open position and a fully closed position;
   a set of tracks supporting the cargo door for movement between the fully open position and the fully closed position;
   a door torsion assembly disposed in the cargo enclosure and configured to apply torque to the cargo door to facilitate movement of the cargo door from the fully closed position to the fully open position; and
   a door operator assembly configured to raise and lower the cargo door, the door operator assembly comprising:
      a power and control unit mounted on the exterior of the cargo enclosure, the power and control unit comprising:
         a motor in communication with a power source, the motor comprising an output configured to be operatively connected to the door torsion assembly;
         a coupler configured to operatively connect the output of the motor to the door torsion assembly, the coupler extending through one of the plurality of walls of the cargo enclosure to engage the door torsion assembly;
         a control circuit configured to relay electrical power from the power source to the motor; and
         a unit enclosure configured to house the motor on the exterior of the cargo enclosure;
   wherein the torsion assembly is configured to be aligned with the coupler.

2. The cargo enclosure according to claim 1, wherein the door operator assembly further comprises an operating switch disposed on the exterior of the cargo enclosure, the operating switch being in communication with the power source and the control circuit and configured to be actuated to activate the motor to raise or lower the cargo door.

3. The cargo enclosure according to claim 1, wherein the power and control unit further comprises a manual release mechanism configured to actuate the coupler to operatively connect and disconnect the output of the motor and the door torsion assembly.

4. The cargo enclosure according to claim 3, wherein the manual release mechanism is disposed in the unit enclosure between the output of the motor and the coupler.

5. The cargo enclosure according to claim 3, wherein the manual release mechanism comprises a lever and a spring retained by a spring plate, the spring being configured to bias the output of the motor and the coupler to engage the door torsion assembly.

6. The cargo enclosure according to claim 1, wherein the unit enclosure comprises a mounting plate fastened to the exterior of the cargo enclosure and a cover removeably fastened to the mounting plate.

7. The cargo enclosure according to claim 1, wherein the door operator assembly further comprises lower and upper limit switches in communication with the power and control unit and a door indicator positioned on the cargo door, wherein the lower and upper limit switches are configured to detect a position of the cargo door and to deactivate the motor as the door approaches the fully open position or the fully closed position.

8. The cargo enclosure according to claim 7, wherein the lower and upper limit switches comprise magnetic limit switches, and the door indicator comprises a magnetic sensor or plate.

9. The cargo enclosure according to claim 1, wherein the door operator assembly further comprises a pusher assembly disposed in the interior of the cargo enclosure adjacent to an upper end of at least one of the tracks, the pusher assembly comprising a spring-loaded plunger configured to engage an end of the cargo door when the cargo door is in the fully open position.

10. The cargo enclosure according to claim 1, wherein the cargo enclosure is configured to be mounted on a vehicle chassis, and the power source is configured to be a vehicle power source.

* * * * *